US008934012B2

(12) United States Patent
Miyamaki et al.

(10) Patent No.: US 8,934,012 B2
(45) Date of Patent: Jan. 13, 2015

(54) APPARATUS AND METHOD FOR MONITORING VIDEO DATA AND METADATA

(75) Inventors: Hideo Miyamaki, Tokyo (JP); Asako Tamura, Kanagawa (JP); Kazuma Tsukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 951 days.

(21) Appl. No.: 11/730,365

(22) Filed: Mar. 30, 2007

(65) Prior Publication Data

US 2007/0250862 A1 Oct. 25, 2007

(30) Foreign Application Priority Data

Apr. 3, 2006 (JP) ................................ 2006-102291

(51) Int. Cl.
*H04N 7/18* (2006.01)
*G08B 13/196* (2006.01)

(52) U.S. Cl.
CPC ................................ *G08B 13/19671* (2013.01)
USPC .......................................................... 348/143

(58) Field of Classification Search
USPC ............ 725/34–35, 46, 10, 12; 348/143, 169, 348/333.02–333.06; 7/34–35, 46; 709/203
See application file for complete search history.

(56) References Cited

U.S. PATENT DOCUMENTS 6,696,945 B1 2/2004 Venetianer et al.
6,877,134 B1 * 4/2005 Fuller et al. ................... 715/202
6,970,083 B2 11/2005 Venetianer et al.
7,868,912 B2 1/2011 Venetianer et al.
7,932,923 B2 4/2011 Lipton et al.
2002/0169825 A1 * 11/2002 Hougland et al. ............ 709/203
2002/0171551 A1 * 11/2002 Eshelman et al. ......... 340/573.1
2003/0093810 A1 * 5/2003 Taniguchi ..................... 725/112
2005/0169367 A1 * 8/2005 Venetianer et al. ...... 375/240.01
2006/0225120 A1 * 10/2006 Lee et al. ...................... 725/131
2006/0256200 A1 11/2006 Matei et al.
2008/0084473 A1 * 4/2008 Romanowich ................ 348/135
2008/0124065 A1 * 5/2008 Chukwu ......................... 396/56

FOREIGN PATENT DOCUMENTS

DE 198 28 320 A1 12/1999
JP 2002-165210 6/2002
JP 2002-183216 6/2002

(Continued)

OTHER PUBLICATIONS

European Search Report for Application No. 07 25 1467 dated May 12, 2009.

(Continued)

*Primary Examiner* — Mekonnen Dagnew
(74) *Attorney, Agent, or Firm* — Finnegan Henderson Farabow Garrett & Dunner LLP

(57) ABSTRACT

A monitoring apparatus includes a video data obtaining section obtaining video data from a monitoring terminal, a metadata obtaining section obtaining metadata describing information on a monitored subject from the monitoring terminal, a filter setting storage section storing a filter setting, a metadata filter section performing filtering processing on the metadata by using a filter setting stored in the filter setting storage section, and an output section outputting a monitoring result based on the filtering processing result obtained by performing filtering processing in the metadata filter section.

8 Claims, 15 Drawing Sheets

(56) References Cited

FOREIGN PATENT DOCUMENTS

| | | |
|---|---|---|
| JP | 2002-300544 | 10/2002 |
| JP | 2003-087772 | 3/2003 |
| JP | 2003-274390 | 9/2003 |
| JP | 2004-096742 | 3/2004 |
| JP | 2004-291784 | 10/2004 |
| JP | 2005-039548 | 2/2005 |
| WO | WO 03/019490 A1 | 3/2003 |

OTHER PUBLICATIONS

Decision of Refuse from European Patent Office in corresponding European Patent Application No. EP07251467 (in English) dated Oct. 11, 2011.

Office Action (*Notification of Reasons for Refusal*) issued in corresponding Korean Patent Application No. 10-2007-0031502, dated Jul. 2, 2013.

* cited by examiner

30

APPARATUS AND METHOD FOR MONITORING VIDEO DATA AND METADATA

CROSS REFERENCES TO RELATED APPLICATIONS

The present invention contains subject matter related to Japanese Patent Application JP 2006-102291 filed in the Japanese Patent Office on Apr. 3, 2006, the entire contents of which being incorporated herein by reference.

BACKGROUND OF THE INVENTION

1. Field of the Invention

The present invention relates to a monitoring apparatus and method. According to the invention, video data and metadata are obtained from a monitoring terminal, and filtering processing is performed on the metadata. Then, the monitoring result is output based on the filtering processing result obtained by performing the filtering processing.

2. Description of the Related Art

A monitoring system in the past supplies video data of a monitoring picture from a monitoring terminal to a monitoring apparatus over a network and records the video data in the monitoring apparatus, whereby the monitoring apparatus may check the monitoring picture having an abnormality (as in JP-A-2003-274390 (Patent Document 1)).

SUMMARY OF THE INVENTION

By the way, when monitoring is performed by using a monitoring system and when the occurrence of an abnormality is determined based on one piece of predefined information, a wide variety of monitoring operations may not be performed. For example, when the occurrence of an abnormality is determined based on moving subject detection information indicating the result of the detection of a moving subject, which is supplied from a monitoring terminal, the monitoring apparatus may determine that an abnormality occurs even for a movement of the moving subject that may not require the notification of the abnormality occurrence.

Furthermore, when the occurrence of an abnormality is determined based on information, which is different from the moving subject detection information, an information obtaining section compliant with the format and timing of the information may be required in the monitoring apparatus in order to properly receive the information, which is different from the moving subject detection information. For that reason, an information obtaining section for each type of information may be required when a wide variety of monitoring operations are to be performed by using various types of information. Therefore, the functions of the monitoring apparatus may not be extended easily.

Accordingly, it is desirable to propose a monitoring apparatus and method, which allow to perform a wide variety of monitoring operations easily.

According to an embodiment of the present invention, video data and metadata describing information relating to a monitored subject are obtained from a monitoring terminal. A filter setting is stored in a filter setting storage section. Filtering processing is performed on metadata by using the stored filter setting, and a monitoring result is output based on the filtering processing result.

The output of a monitoring result includes a picture indicating the monitoring result by using one of a picture based on video data, a picture based on metadata and a picture showing the filter setting used in the metadata filter section or a picture resulting from the synthesis of multiple pictures.

The obtained video data and metadata are stored to allow playing the stored video data and metadata. Here, when video data and metadata are played together, a play synchronizing section plays metadata in synchronization with video data to be played.

In this embodiment, when a moving subject is to be monitored by the monitoring apparatus, the information relating to the monitored subject includes moving subject detection information indicating whether a moving subject has been detected or not and/or moving subject position information indicating the position of a moving subject. When the state of an area monitored by a monitoring terminal is monitored, the information relating to a monitored subject includes information indicating the intensity of a monitoring picture and/or information indicating the temperature.

A filter setting functioning as a criterion of the necessity for outputting an alarm, for example, based on the information relating to a monitored subject is stored in the filter setting storage section for each information. Using the filter setting to perform filtering processing on metadata can indicate the necessity for outputting an alarm, for example, in the filtering processing result for each information relating to a monitored subject. Outputting a monitoring result based on the filtering processing result allows outputting an alarm, for example, for each information relating to a monitored subject. For example, when a moving subject is detected, when a moving subject enters to a predefined area, when a monitored area is darkened and/or when an abnormality in temperature occurs, an alarm corresponding to the state can be output.

The monitoring result can be displayed graphically, which allows easy and proper recognition of the monitoring result, since a picture indicating the monitoring result is output by using one of a picture based on video data, a picture based on metadata and a picture showing the filter setting used in the metadata filter section or a picture resulting from the synthesis of multiple pictures.

Describing information relating to a monitored subject in a markup language allows easy change and/or addition of a filter setting in order to change and/or add information relating to the monitored subject.

According to the embodiment of the invention, video data and metadata indicating information relating to a monitored subject are obtained from a monitoring terminal by a monitoring apparatus. Further in the monitoring apparatus, filtering processing is performed on metadata by using a filter setting stored in the filter setting storage section, and the monitoring result is output based on the filtering processing result. Thus, a wide variety of monitoring operations are easily allowed, and the monitoring result can be output by storing a filter setting corresponding to the information included in metadata in the filter setting storage section where the metadata includes various types of information relating to a monitored subject.

DESCRIPTION OF THE PREFERRED EMBODIMENTS

Figure 1:
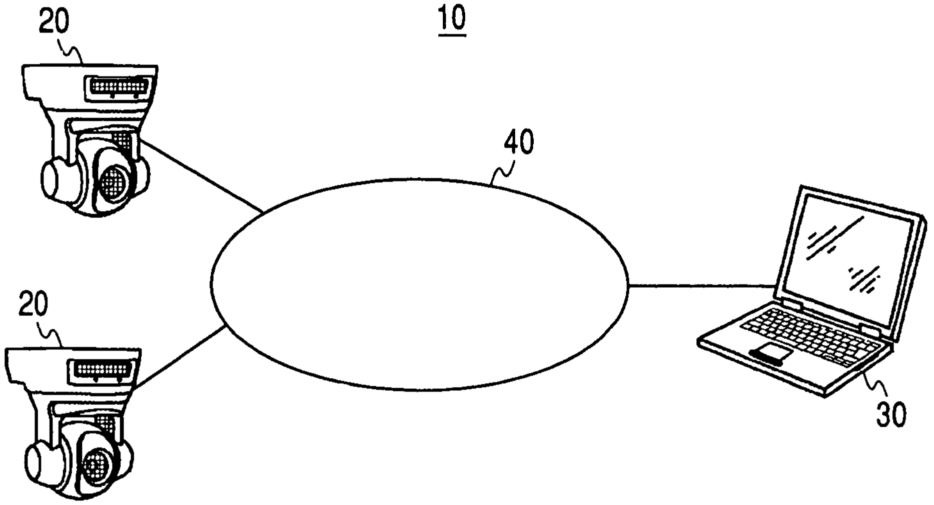
FIG. 1 is a diagram showing a configuration of a monitoring system.

With reference to drawings, an embodiment of the invention will be described below. FIG. 1 shows a construction of a monitoring system 10. A monitoring terminal 20 and a monitoring apparatus 30 are connected over a network 40. The monitoring terminal 20 creates video data of a monitoring picture and creates metadata describing information relating to a monitored subject. The monitoring apparatus 30 may remotely control the monitoring terminal 20, obtain, analyze and store the video data and/or metadata created by the monitoring terminal 20 and view a stored picture.

Figure 2:
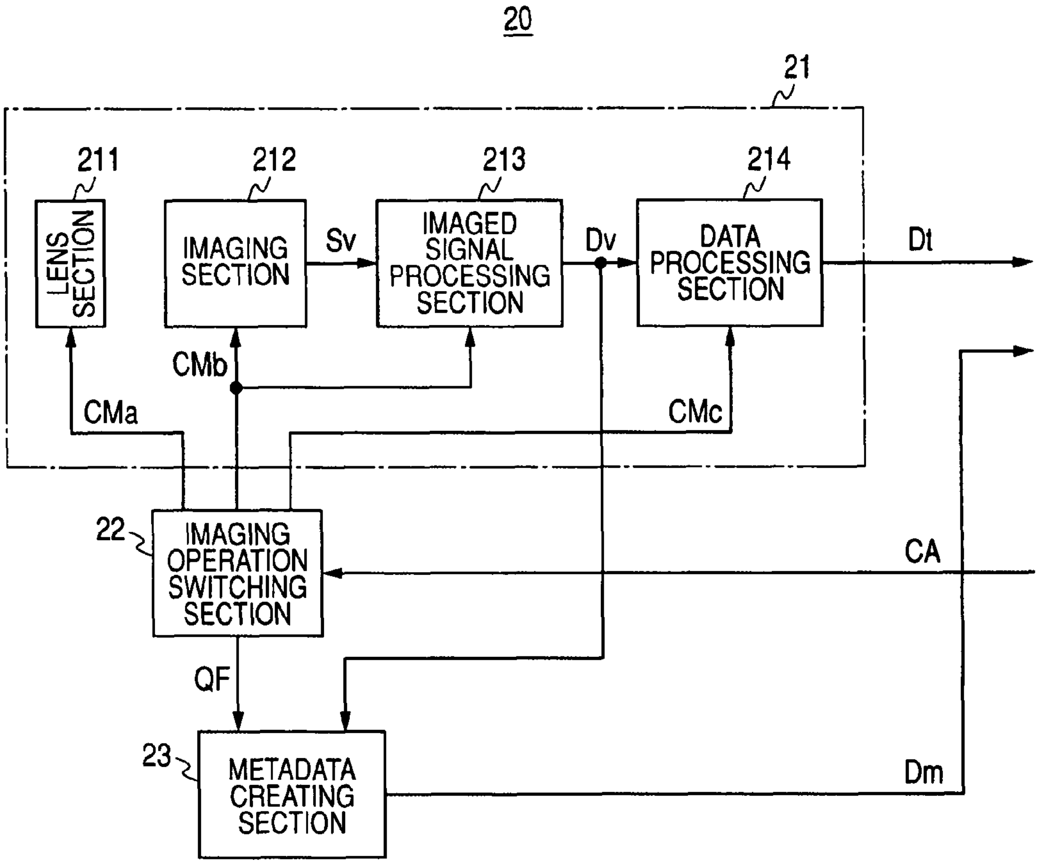
FIG. 2 is a functional block diagram of a monitoring terminal.

FIG. 2 is a functional block diagram of the monitoring terminal. The monitoring terminal 20 has a video data creating section 21 and a metadata creating section 23. The video data creating section 21 creates video data Dt of a monitoring picture. In other words, an imaging section 212 creates and supplies an imaged signal Sv to an imaged signal processing section 213 based on incident light input through a lens section 211. The imaged signal processing section 213 creates video data Dv by performing A/D conversion, knee correction or a process, for example.

A data processing section 214 creates video data Dt by performing encoding processing on the video data Dv in order to reduce the amount of data of a monitoring picture to be communicated. The data processing section 214 further supplies the created video data Dt as in a predetermined data structure to the monitoring apparatus 30.

An imaging operation switching section 22 switches the operation by the monitoring terminal 20 so as to obtain an optimum monitoring picture based on a switching instructing signal CA from the monitoring apparatus 30. For example, the imaging operation switching section 22 may select the zoom ratio or iris by supplying a control signal CMa to the lens section 211, switch the frame rate of a monitoring picture by supplying a control signal CMb to the imaging section 212 and image signal processing section 213 and switch the compression rate of video data by supplying a control signal CMc to the data processing section 214, for example. The imaging operation switching section 22 may further switch the direction of imaging, for example.

The metadata creating section 23 creates metadata Dm describing information relating to a monitored subject. When a moving subject is to be monitored, for example, the moving subject is detected by using the video data Dv created by the video data creating section 21, and moving subject detection information indicating whether a moving subject is detected or not and/or moving subject position information indicating the position of the detected moving subject are created. The information is included in the metadata as the information relating to the monitored subject. The metadata creating section 23 may use information on the type and/or state of a moving subject as the information relating to a monitored subject.

The information relating to a monitored subject may be information indicating the state of an area monitored by the monitoring terminal, not limiting to the information relating to a moving subject. For example, information indicating the temperature and/or brightness of a monitored area may be used. Alternatively, information on an operation performed in a monitored area may be used. When the temperature is to be monitored, the metadata creating section 23 includes the temperature measurement result in metadata. When the brightness is to be monitored, the metadata creating section 23 determines the average intensity of a monitoring picture, for example, based on the video data Dv created by the video data creating section 21 and includes the determination result in metadata. When a user operation performed on an ATM (Automated Teller Machine) or a POS (Point Of Sales) terminal, for example, is to be monitored, the metadata creating section 23 includes the information indicating the user operation on an operation key or an operation panel, for example, in metadata. By including imaging operation information QF (such as information indicating the direction of shooting, the zoom state and the setting state of the video data creating section when video data of a monitoring picture is created), and/or time information, which is supplied from the imaging operation switching section 22, in metadata, the metadata creating section 23 can determine the time when the metadata is created and/or how the video data has been created.

Figure 3A:
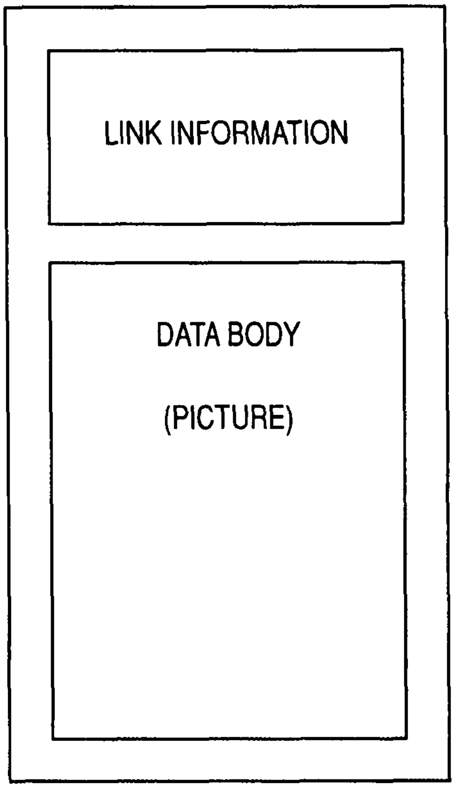
FIGS. 3A and 3B are diagrams showing data structures.
Figure 3B:
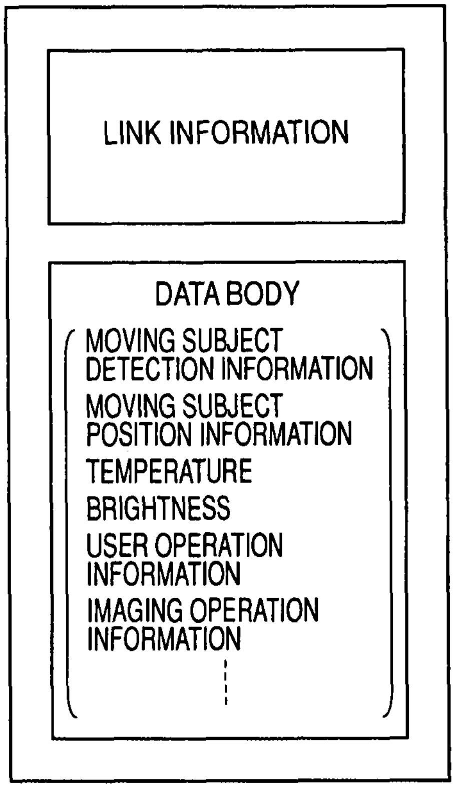

FIGS. 3A and 3B show data structures of video data and metadata. Each of the video data and metadata includes link information and a data body. The data body of video data is video data of a monitoring picture. The data body of metadata describes information indicating a monitored subject, for example, and attribute information defining the description method of the information. The link information describes association information indicating the association between video data and metadata and attribute information defining the description method of the data of the information, for example.

A time stamp and/or sequence number for identifying video data is used as the association information. The time stamp is information (time information) providing the time when the video data is created. The sequence number is information (order information) providing the order of creating contents data. When multiple monitoring pictures have equal time stamps, the order of creating video data having equal time stamps can be identified. Alternatively, information for identifying a device that creates video data (such as the names of the manufacturer and machine type and the serial number) may be used as the association information.

Here, the link information and/or metadata body are described in a markup language defined as a method for describing information to be exchanged over the Web. Using a markup language in this way allows easy exchange of information over the network 40. Furthermore, using a markup language such as XML, which is used for the exchange, of documents and/or electronic data, for example, allows easy exchange of video data and/or metadata. When XML is used, the attribute information defining the method for describing information may be XML Schema, for example.

The video data and/or metadata created by the monitoring terminal 20 may be supplied to the monitoring apparatus 30 as one stream, or the video data and metadata may be supplied to the monitoring apparatus 30 asynchronously as different streams.

Figure 4:
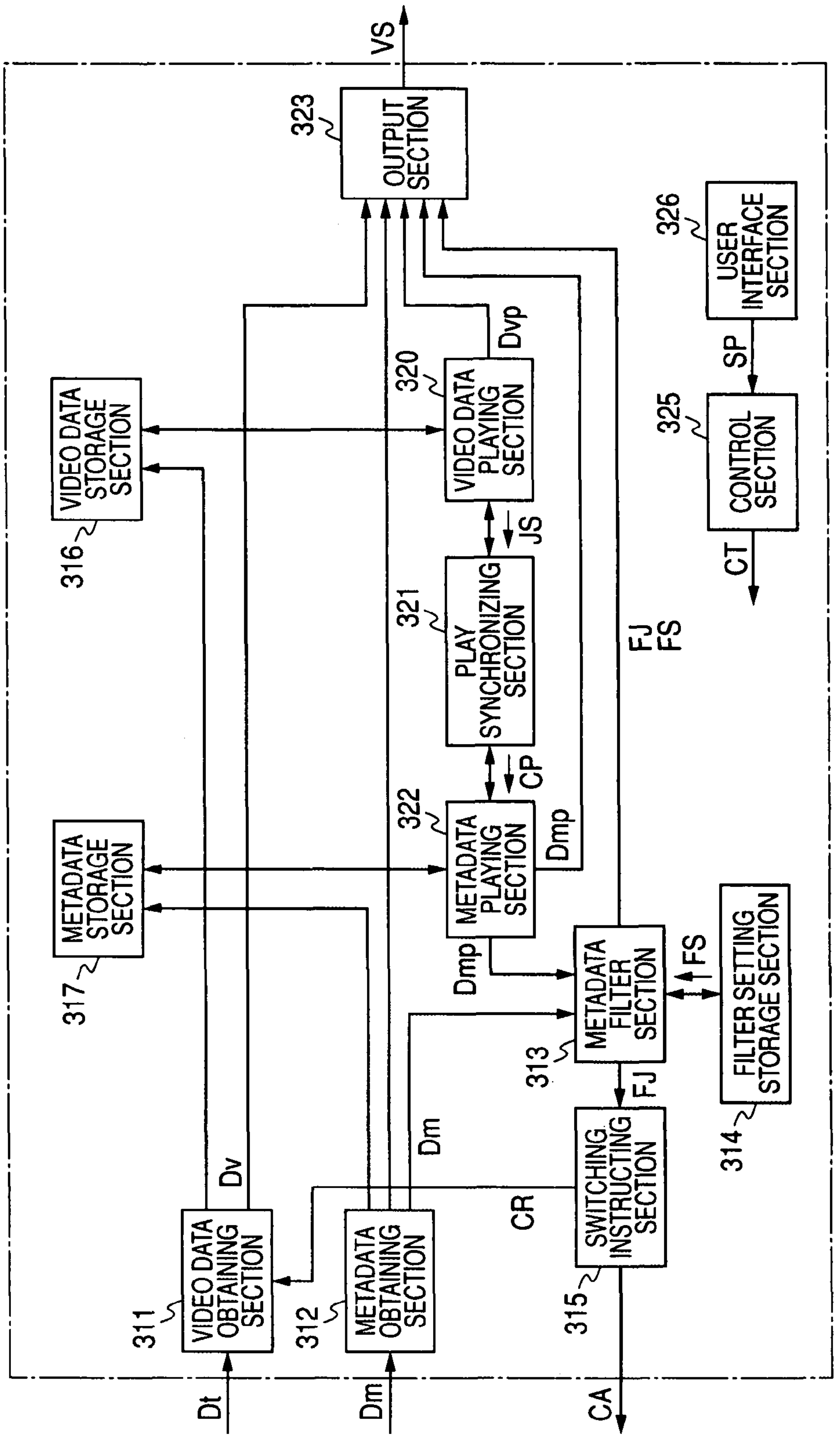
FIG. 4 is a functional block diagram of a monitoring apparatus.

FIG. 4 is a functional block diagram of the monitoring apparatus. Each of the functional blocks of the monitoring apparatus may be configured by hardware or software.

A video data obtaining section 311 of the monitoring apparatus 30 obtains video data Dt from the monitoring terminal 20. The video data obtaining section 311 further performs decoding processing on encoded video data Dt and holds the resulting video data Dv in a buffer (not shown) in the video data obtaining section 311. The video data obtaining section 311 supplies the held video data Dv sequentially to an output section 323. By holding video data in a buffer in this way, video data may be sequentially output to the output section 323 independent of the timing of the video data from the monitoring terminal. The video data obtaining section 311 causes a video data storage section 316 to store the held video data Dv based on a storage instructing signal CR from a switching instructing section 315, which will be described later, in a video data storage section 316. Encoded video data Dt may be stored in the video data storage section 316 and may be decoded by a video data playing section 320, which will be described later.

A metadata obtaining section 312 obtains the metadata Dm from the monitoring terminal 20 and holds it in a buffer (not shown) in the metadata obtaining section 312. The metadata obtaining section 312 supplies the held metadata Dm sequentially to the output section 323. The metadata obtaining section 312 further performs processing of supplying the held metadata Dm to a metadata filter section 313. By holding metadata in a buffer in this way, metadata may be sequentially supplied to the output section 323 independent of the timing of the metadata from the monitoring terminal 20. Metadata may be supplied to the output section 323 in synchronization with the video data. The metadata obtaining section 312 causes a metadata storage section 317 to store the metadata Dm obtained from the monitoring terminal 20. Here, by adding time information of the video data Dv in synchronization with the metadata Dm when the metadata Dm is stored in the metadata storage section 317, the metadata at a desired time may be loaded from the metadata storage section 317 by using the added time information without loading the descriptions of the metadata Dm and determining the time.

The metadata filter section 313 performs filtering processing on the metadata Dm obtained by the metadata obtaining section 312 or the metadata Dmp supplied from the metadata storage section 317 by using a filter setting FS stored in a filter setting storage section 314 and supplies the filtering processing result FJ to the switching instructing section 315 and the output section 323.

The filter setting storage section 314 stores a filter setting FS and supplies a filter setting in accordance with the filtering processing to be performed by the metadata filter section 313 to the metadata filter section 313. The filter setting FS indicates the criterion for the necessity for outputting an alarm and/or for switching the imaging operation in the monitoring terminal for each information relating to a monitored subject, which is included in metadata. By performing filtering processing on metadata by using the filter setting FS, the necessity for outputting an alarm and/or for switching the imaging operation in the monitoring terminal may be indicated by the filtering processing result for each information relating to a monitored subject.

The switching instructing section 315 generates and supplies the switching instructing signal CA to the monitoring terminal 20 based on the filtering processing result, FJ from the metadata filter section 313. For example, an operation by the monitoring terminal 20 may be switched so as to obtain a monitoring picture suitable for monitoring based on the filtering processing result FJ. The switching instructing section 315 further supplies a storage instructing signal CR to the video data storage section 316 based on the filtering processing result FJ and causes the video data storage section 316 to store the video data Dv obtained by the video data obtaining section 311.

A mode for storing the video data Dv is selectable in the switching instructing section 315. For example, one of a dynamic search mode and a minimum mode may be selectable, for example. When the dynamic search mode is selected by a user and when the filtering processing result FJ indicates that a moving subject has been detected, the switching instructing section 315 causes the video data storage section 316 to store the video data Dv obtained by the video data obtaining section 311. When the minimum mode is selected and when the fact that the occurrence of the state that may require outputting a warning or alarm is determined based on the filtering processing result FJ, the switching instructing section 315 causes the video data storage section 316 to store the video data Dv obtained by the video data obtaining section 311. Here, when the dynamic search mode is selected, the video data Dv at the time when a moving subject is detected is stored. Thus, by playing the stored video data Dv and performing filtering processing with a desired filter setting on the metadata in synchronization with the played video data Dv by a video data playing section 320, which will be described later, the video data satisfying the filter setting can be searched. When the minimum mode is selected, the video data of the state that may require outputting a warning or alarm can be played easily and quickly. In addition, the amount of video data to store can be reduced.

The video data storage section 316 stores the video data Dv obtained by the video data obtaining section 311. The metadata storage section 317 stores the metadata Dm obtained by the metadata obtaining section 312.

The video data playing section 320 performs processing of playing the video data Dv stored in the video data storage section 316. In other words, the video data playing section 320 loads video data sequentially from the position to play, which is instructed by a user, and supplies the loaded video data Dvp to the output section 323. The video data playing section 320 further supplies the played position (played time) JS of the video data being played to a play synchronizing section 321.

The play synchronizing section 321 supplies a synchronization control signal CP to a metadata playing section 322 and controls an operation by the metadata playing section 322 so as to synchronize the played position JS supplied from the video data playing section 320 and the position to play the metadata, which is stored in the metadata storage section 317, by the metadata playing section 322.

The metadata playing section 322 performs processing of playing the metadata Dm stored in the metadata storage section 317. In other words, the metadata playing section 322 loads metadata sequentially from the position to play, which is instructed by a user, and supplies the loaded metadata Dmp to the metadata filter section 313 and output section 323. In order to play both of video data and metadata, the metadata playing section 322 controls the playing operation based on a synchronization control signal CP supplied from the play synchronizing section 321 as described above and outputs the metadata Dmp in synchronization with the video data Dvp.

The output section 323 generates and outputs a display signal VS of a picture indicating a monitoring result based on the filtering processing result FJ by using one of a monitoring picture, a picture of metadata and a picture of a filter setting or a picture resulting from the combination of them based on the video data Dv supplied from the video data obtaining section 311, the video data Dvp supplied from the video data playing section 320, the metadata Dm supplied from the metadata obtaining section 312, the metadata Dmp supplied from the metadata playing section 322 and/or the filter setting FS from the metadata filter section 313.

A user interface section 326 is connected to the control section 325. The user interface section 326 includes an operation key and/or a remote control signal receiver. The user interface section 326 generates and supplies an operation signal SP in accordance with a user operation to the control section 325. The control section 325 controls the monitoring apparatus 30 to operate in accordance with a user operation by generating and supplying a control signal CT based on the operation signal SP to each component.

Next, operations in a case that each of the components is configured by software will be described with reference to flowcharts.

Figure 5:
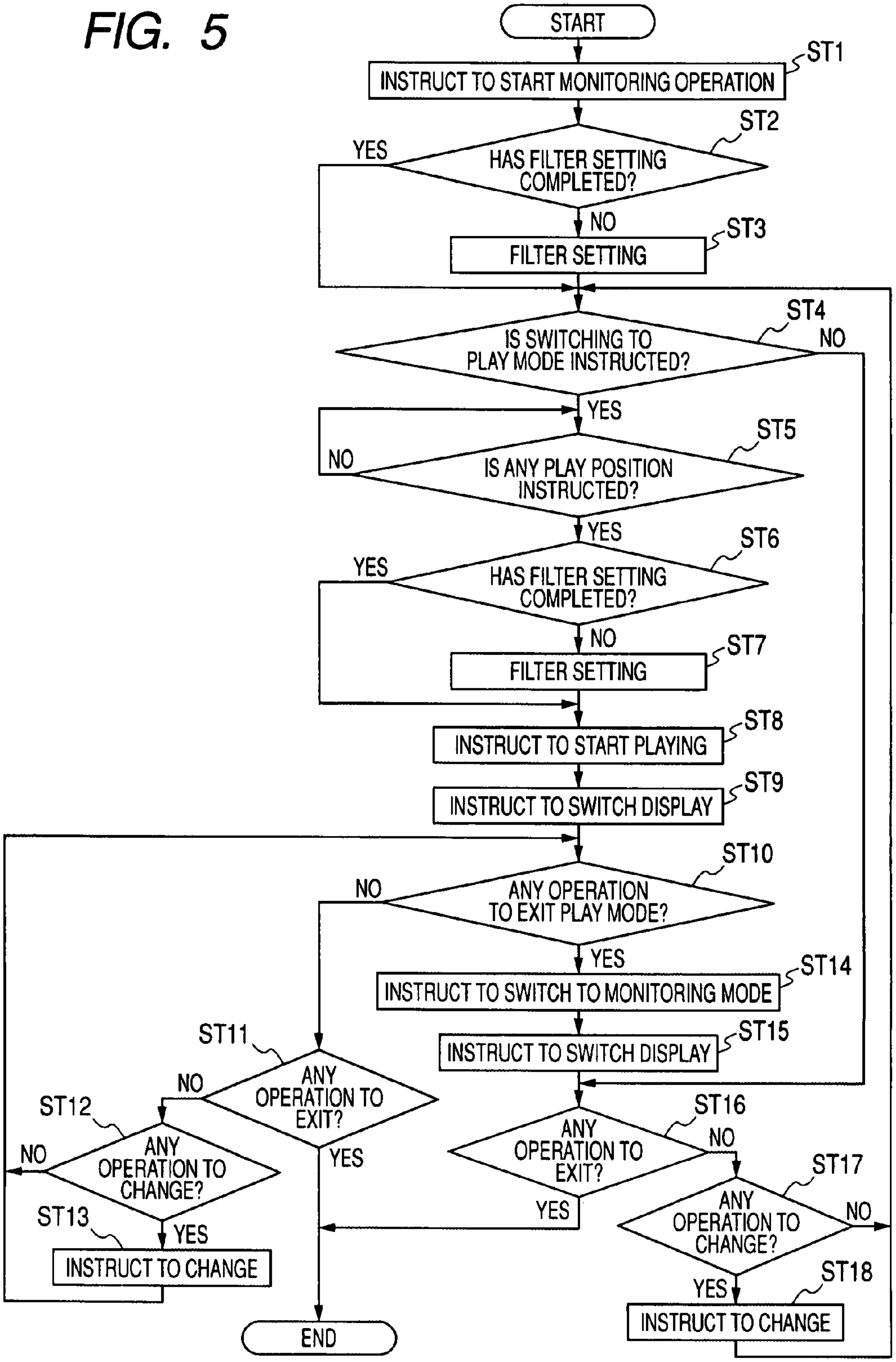
FIG. 5 is a flowchart showing operations by a control section.

FIG. 5 shows operations by the control section. In step ST1, the control section 325 instructs to start a monitoring operation. The instruction to start a monitoring operation starts operations by the components excluding the video data playing section 320 and metadata playing section 322, and the control section 325 moves to step ST2.

In step ST2, the control section 325 determines whether filter setting has completed or not. If the filter setting on the metadata filter section 313 has not completed, the control section 325 moves to step ST3. If the filter setting has completed, the control section 325 moves to step ST4.

In step ST3, the control section 325 performs filter setting. In the filter setting, the fact that the filter setting on the metadata filter section 313 has not completed may be displayed on the screen of a display device, for example. After that, based on the operation signal SP supplied from the user interface section 326, the control section 325 defines the filter setting in accordance with a user operation in the metadata filter section 313 and moves to step ST4.

In step ST4, the control section 325 determines whether the switching from a monitoring mode to a play mode has been instructed or not. The monitoring mode here refers to an operation mode that causes the output section 323 to output a picture based on video data held in the video data obtaining section 311 and/or metadata held in the metadata obtaining section 312. The play mode here refers to an operation mode that causes the output section 323 to output a picture based on video data played by the video data playing section 320 and/or metadata played by the metadata playing section 322.

If it is determined that the switching to the play mode has been instructed based on the operation signal SP from the user interface section 326, the control section 325 moves to step ST5. If it is not determined that the switching to the play mode has been instructed, the control section 325 moves to step ST16.

In step ST5, the control section 325 determines whether the position to play has been instructed or not. If the position to play has not been instructed, the control section 325 returns to step ST5. If the position to play has been instructed by the operation signal SP, the control section 325 moves to step ST6.

In step ST6, the control section 325 determines whether the filter setting in the play mode has completed or not. If the filter setting on the metadata filter section 313 has not completed, the control section 325 moves to step ST7. If the filter setting has completed, the control section 325 moves to step ST8.

In step ST7, the control section 325 performs the filter setting in the same manner as in step ST3 and moves to step ST8.

In step ST8, the control section 325 instructs to start playing and moves to step ST9. In other words, the control section 325 starts the operations by the video data playing section 320, play synchronizing section 321 and/or metadata playing section 322 to play video data and/or metadata from the position to play, which is determined as instructed in step ST5.

In step ST9, the control section 325 instructs to switch the display and moves to step ST10. In other words, the control section 325 instructs the output section 323 to switch the display and causes the output section 323 to output a display signal VS of a picture resulting from the synthesis of the picture based on the video data played by the video data playing section 320, the picture based on the metadata played by the metadata playing section 322 and the picture based on the filter setting in the metadata filter section 313.

In step ST10, the control section 325 determines whether the operation for exiting the play mode has been performed or not. If the supplied operation signal SP does not indicate the operation for exiting the play mode, the control section 325 moves to step ST11. If the supplied operation signal SP indicates the operation for exiting the play mode, the control section 325 moves to step ST14.

In step ST11, the control section 325 determines whether the operation for exiting has been performed or not. If the supplied operation signal SP does not indicate the operation for exiting the play mode, the control section 325 moves to step ST12. If the supplied operation signal SP indicates the operation for exiting the play mode, the control section 325 exits the operation by the monitoring apparatus 30.

In step ST12, the control section 325 determines whether a changing operation has been performed or not. If the supplied operation signal SP does not indicate a changing operation, the control section 325 returns to step ST10. If the supplied operation signal SP indicates a changing operation, the control section 325 moves to step ST13.

In step ST13, the control section 325 instructs to change in accordance with a changing operation and returns to step ST10. For example, in response to a changing operation for changing the position to play, the control section 325 may instruct the video data playing section 320 and/or metadata playing section 322 to perform a playing operation from the changed position to play. If a changing operation for changing the filter setting is performed, the control section 325 instructs the metadata filter section 313 to perform filtering processing with the changed filter setting.

After moving from step ST10 to step ST14, the control section 325 instructs the switching to the monitoring mode and moves to step ST15. In other words, the control section 325 exits the operations by the video data playing section 320, play synchronizing section 321 and metadata playing section 322. The control section 325 also returns the filter setting of the metadata filter section 313 to the filter setting in the monitoring mode.

In step ST15, the control section 325 instructs display switching and moves to step ST16. In other words, the control section 325 controls the output section 323 through the display switching instruction to generate a display signal for displaying a picture resulting from the synthesis of a picture based on video data from the video data obtaining section 311, a picture based on metadata from the metadata obtaining section 312 and a picture based on the filter setting in the metadata filter section 313 and causes the output section 323 to output the picture.

In step ST16, the control section 325 determines whether an exiting operation has been performed or not. If the supplied operation signal SP does not indicate the exiting operation, the control section 325 moves to step ST17. If the supplied operation signal SP indicates the exiting operation, the control section 325 exits the operation by the monitoring apparatus.

In step ST17, the control section 325 determines whether a changing operation has been performed or not. If the supplied operation signal SP does not indicate a changing operation, the control section 325 returns to step ST4. If the supplied operation signal SP indicates a changing operation, the control section 325 moves to step ST18.

In step ST18, the control section 325 performs a changing instruction in accordance with a changing operation and returns to step ST4. For example, if a changing operation for changing a filter setting is performed, the control section 325 may instruct the metadata filter section 313 to perform filtering processing with the changed filter setting.

Figure 6:
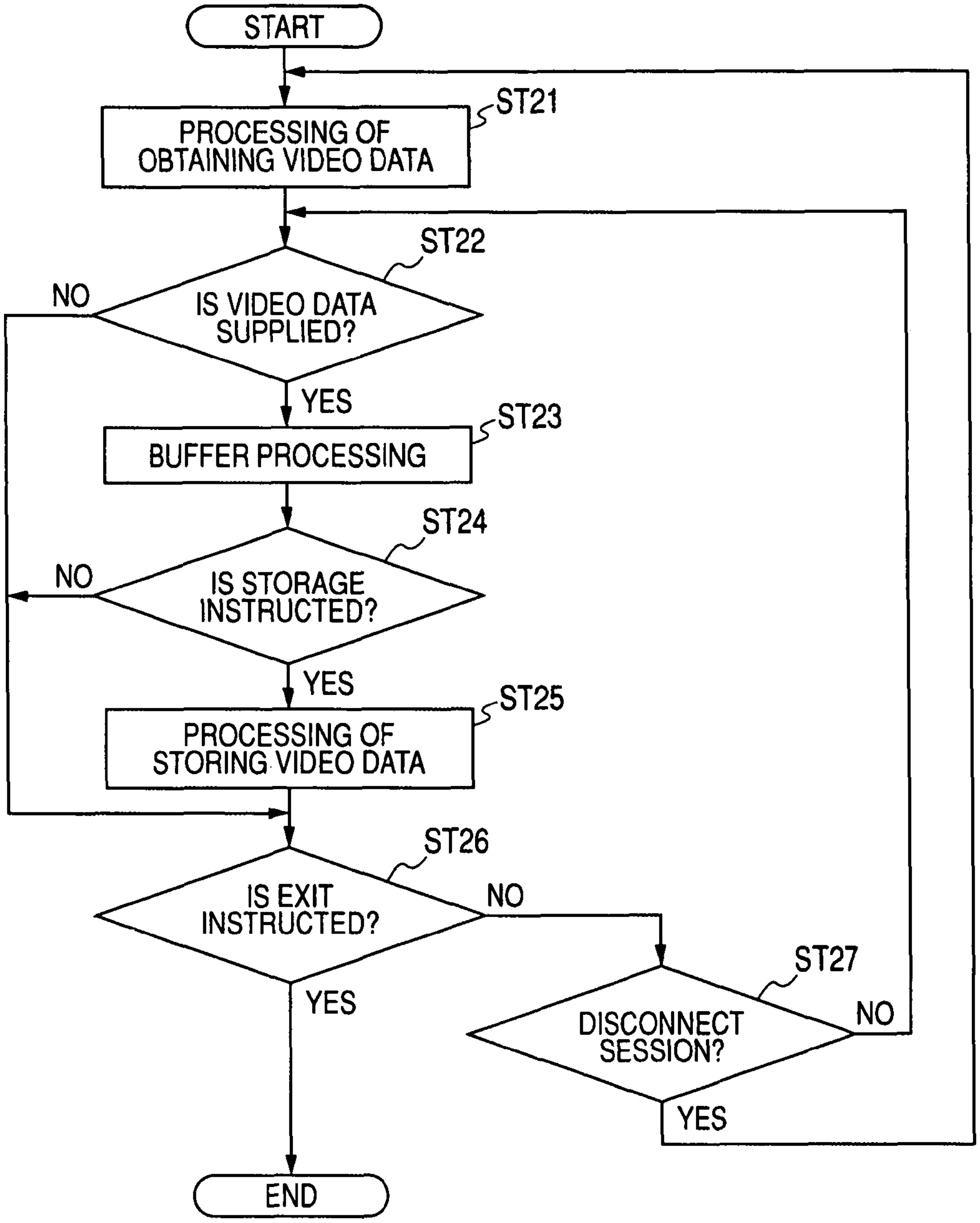
FIG. 6 is a flowchart showing operations by a video data obtaining section.

FIG. 6 is a flowchart showing operations by the video data obtaining section. In step ST21, the video data obtaining section 311 performs processing of obtaining video data. In other words, the video data obtaining section 311 requests video data to the monitoring terminal 20 and/or establishes the session with the monitoring terminal 20 and moves to step ST22.

In step ST22, the video data obtaining section 311 determines whether video data has been supplied from the monitoring terminal 20 or not. If video data has been supplied, the video data obtaining section 311 moves to step ST23. If video data has not been supplied, the video data obtaining section 311 moves to step ST26.

In step ST23, the video data obtaining section 311 performs buffer processing on video data and moves to step ST24. In the buffer processing, the video data obtaining section 311 holds the video data supplied from the monitoring terminal 20. Furthermore, the video data obtaining section 311 supplies the held video data to the output section 323.

In step ST24, the video data obtaining section 311 determines whether a storage instructing signal CR has been supplied from the switching instructing section 315 or not. If the storage instructing signal CR has supplied, the video data obtaining section 311 moves to step ST25. If the storage instructing signal CR has not been supplied, the video data obtaining section 311 moves to step ST26.

In step ST25, the video data obtaining section 311 performs video data storage processing and stores the held video data in the video data storage section 316 and moves to step ST26.

In step ST26, the video data obtaining section 311 determines whether the exit instruction has been supplied from the control section 325 or not. If the exit instruction has not been instructed from the control section 325, the video data obtaining section 311 moves to step ST27. If the exit instruction has been supplied from the control section 325, the video data obtaining section 311 exits the operation.

In step ST27, the video data obtaining section 311 determines whether the session with the monitoring terminal 20 is disconnected or not. If the session is not disconnected, the video data obtaining section 311 returns to step ST22. If the session is disconnected, the video data obtaining section 311 returns to step ST21 and establishes the session again and obtains video data.

Figure 7:
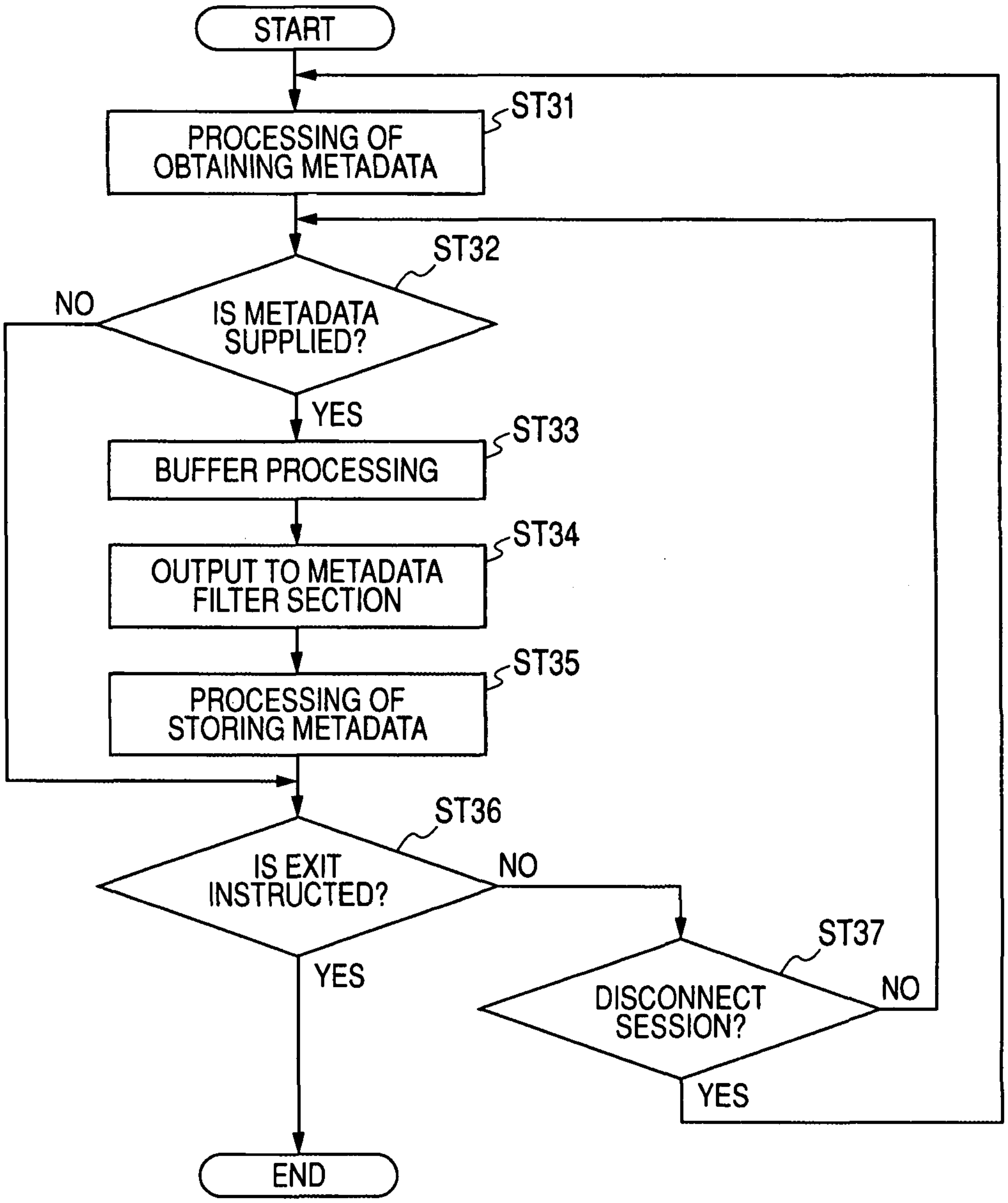
FIG. 7 is a flowchart showing operations by a metadata obtaining section.

FIG. 7 is a flowchart showing operations by the metadata obtaining section. In step ST31, the metadata obtaining section 312 performs processing of obtaining metadata. In other words, the metadata obtaining section 312 requests metadata to the monitoring terminal 20 and/or establishes the session with the monitoring terminal 20 and moves to step ST32.

In step ST32, the metadata obtaining section 312 determines whether metadata has been supplied from the monitoring terminal 20 or not. If metadata has been supplied, the metadata obtaining section 312 moves to step ST33. If metadata has not been supplied, the metadata obtaining section 312 moves to step ST36.

In step ST33, the metadata obtaining section 312 performs buffer processing on metadata and moves to step ST34. In the buffer processing, the metadata obtaining section 312 holds the metadata supplied from the monitoring terminal 20. Furthermore, the metadata obtaining section 312 supplies the held metadata to the output section 323.

In step ST34, the metadata obtaining section 312 outputs the held metadata to the metadata filter section 313 and moves to step ST35.

In step ST35, the metadata obtaining section 312 stores the held metadata in the metadata storage section 317 and moves to step ST36.

In step ST36, the metadata obtaining section 312 determines whether the exit instruction has been supplied from the control section 325 or not. If the exit instruction has not been instructed from the control section 325, the metadata obtaining section 312 moves to step ST37. If the exit instruction has been supplied from the control section 325, the metadata obtaining section 312 exits the operation.

In step ST37, the metadata obtaining section 312 determines whether the session with the monitoring terminal 20 is disconnected or not. If the session is not disconnected, the metadata obtaining section 312 returns to step ST32. If the session is disconnected, the metadata obtaining section 312 returns to step ST31 and establishes the session again and obtains metadata.

Figure 8:
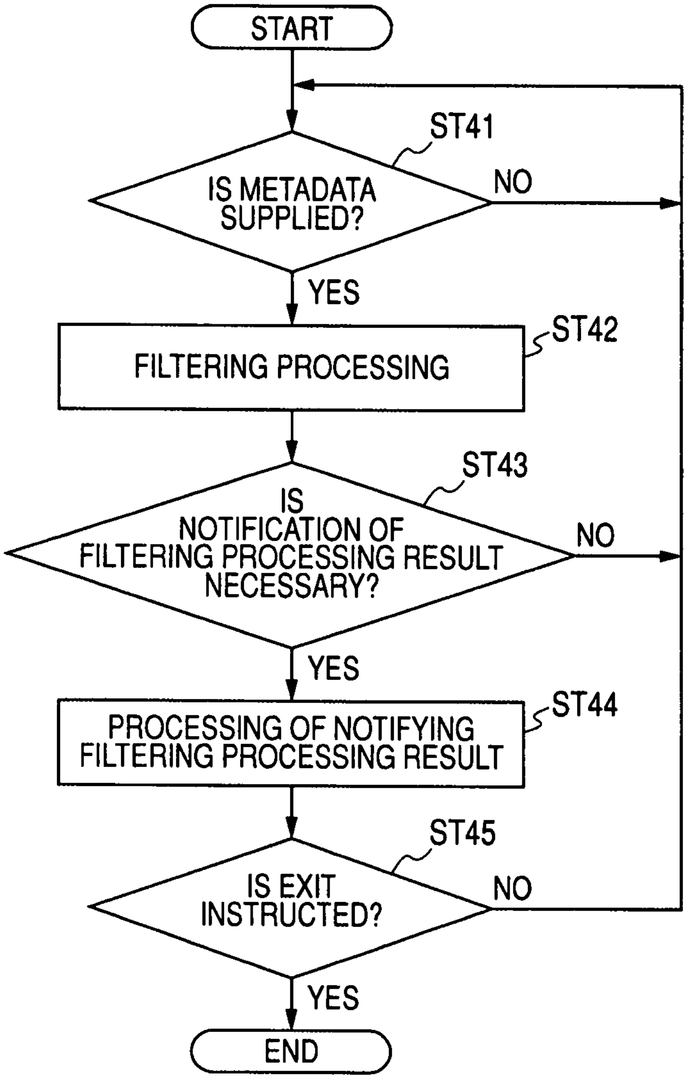
FIG. 8 is a flowchart showing operations by a metadata filter section.

FIG. 8 is a flowchart showing operations by the metadata filter section. In step ST41, the metadata filter section 313 determines whether metadata has been supplied or not. If metadata has not been supplied, the metadata filter section 313 returns to step ST41. If metadata has been supplied, the metadata filter section 313 moves to step ST42.

In step ST42, the metadata filter section 313 performs filtering processing on the metadata and moves to step ST43.

In step ST43, the metadata filter section 313 determines whether the notification of the filtering processing result is necessary or not. If it is determined that the notification is not necessary, the metadata filter section 313 returns to step ST41. If it is determined that the notification is necessary, the metadata filter section 313 moves to step ST44. For example, if it is determined that the output of a warning or alarm is not necessary, the metadata filter section 313 may return to step ST41. If it is determined that the output of a warning or alarm is necessary, the metadata filter section 313 moves to step ST44.

In step ST44, the metadata filter section 313 notifies the filtering processing result. In other words, the metadata filter section 313 supplies the filtering processing result to the switching instructing section 315 and/or output section 323 and moves to step ST45.

In step ST45, the metadata filter section 313 determines whether the exit instruction has been supplied from the control section 325 or not. If the exit instruction has not been supplied from the control section 325, the metadata filter section 313 returns to step ST41. If the exit instruction has been supplied from the control section 325, the metadata filter section 313 exits the operation.

Figure 9:
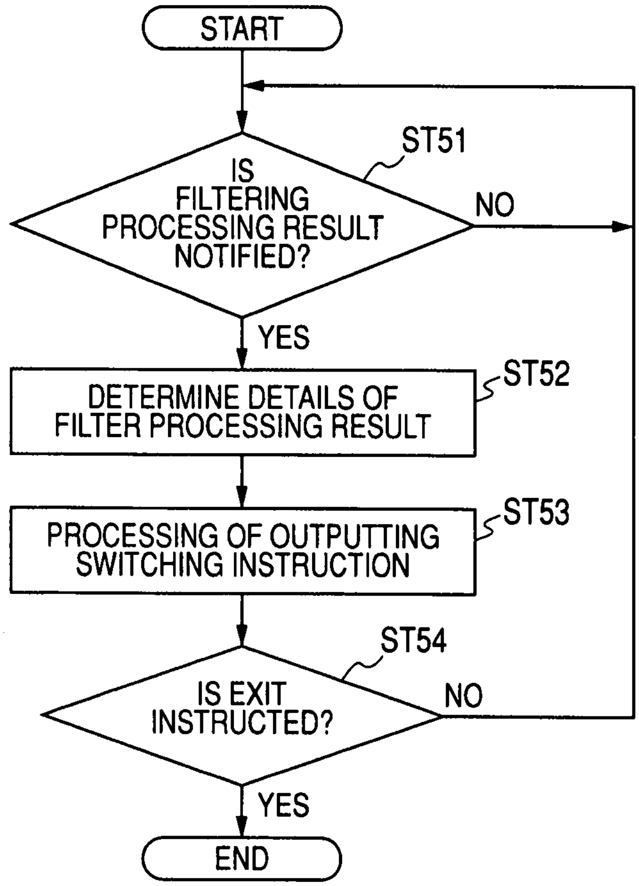
FIG. 9 is a flowchart showing operations by a switching instructing section.

FIG. 9 is a flowchart showing operations by the switching instructing section. In step ST51, the switching instructing section 315 determines whether a filtering processing result has been notified from the metadata filter section 313 or not. If not, the switching instructing section 315 returns to step ST51. If so, the switching instructing section 315 moves to step ST52.

In step ST52, the switching instructing section 315 determines the details of the filtering processing result and moves to step ST53.

In step ST53, the switching instructing section 315 performs processing of outputting a switching instruction. In other words, the switching instructing section 315 generates and outputs a switching instruction based on the result of the determination of the details. For example, the switching instructing section 315 may supply a storage instructing signal CR to the video data obtaining section 311. The storage instructing signal CR is for storing obtained video data in the video data storage section 316. The switching instructing section 315 further supplies a switching instructing signal CA to the monitoring terminal 20 to cause the monitoring terminal 20 to create video data of a monitoring picture suitable for monitoring.

In step ST54, the switching instructing section 315 determines whether the exit instruction has been supplied from the control section 325 or not. If the exit instruction has not been supplied from the control section 325, the switching instructing section 315 returns to step ST51. If the exit instruction has been supplied from the control section 325, the switching instructing section 315 exits the operation.

Figure 10:
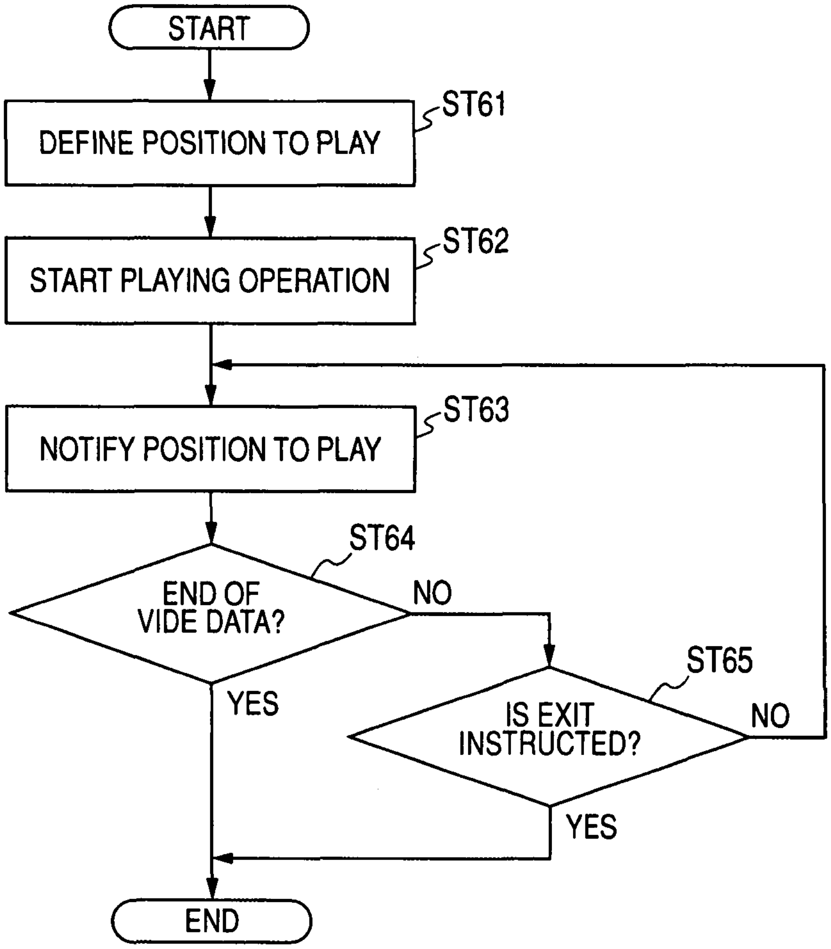
FIG. 10 is a flowchart showing operations by a video data playing section.

FIG. 10 is a flowchart showing operations by the video data playing section. In step ST61, the video data playing section 320 defines the position to play. In other words, the video data playing section 320 defines the position selected by a user through the user interface section 326 as the position to play and moves to step ST62.

In step ST62, the video data playing section 320 starts a playing operation and sequentially loads the video data stored in the video data storage section 316 from the position to play and supplies it to the output section 323.

In step ST63, the video data playing section 320 notifies the play synchronizing section 321 of the played position of video data being played and moves to step ST64.

In step ST64, the video data playing section 320 determines whether video data is at the end or not. If the video data is not at the end, the video data playing section 320 moves to step ST65. If the video data is at the end, the video data playing section 320 exits the operation.

In step ST65, the video data playing section 320 determines whether the exit instruction has been supplied from the control section 325 or not. If the exit instruction has not been supplied from the control section 325, the video data playing section 320 returns to step ST63. If the exit instruction has been supplied from the control section 325, the video data playing section 320 exits the operation.

Figure 11:
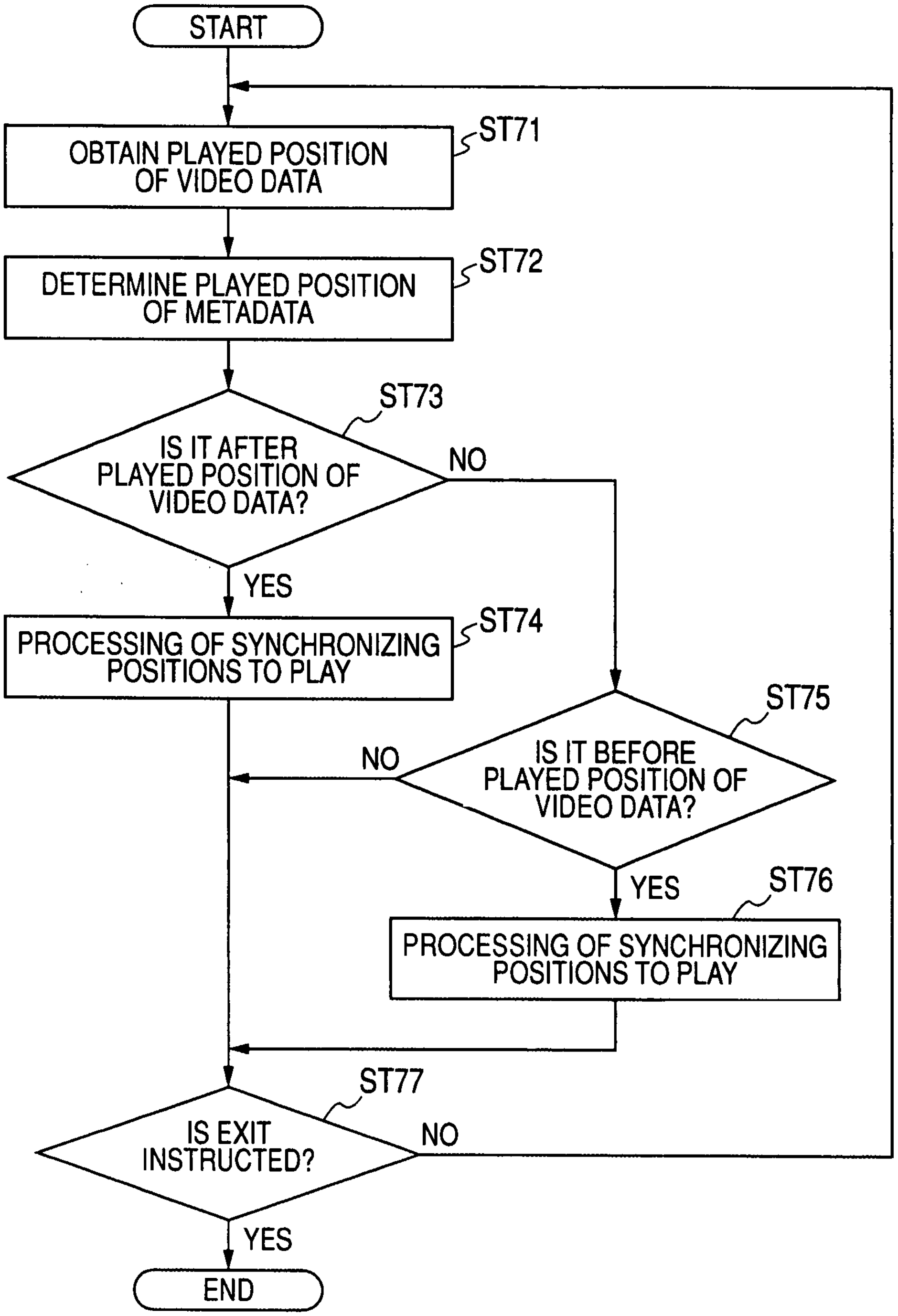
FIG. 11 is a flowchart showing operations by a play synchronizing section.

FIG. 11 is a flowchart showing operations by the play synchronizing section. In step ST71, the play synchronizing section 321 obtains the played position of video data from the video data playing section 320 and moves to step ST72.

In step ST72, the play synchronizing section 321 determines the played position of metadata in the metadata playing section 322 and moves to step ST73.

In step ST73, the play synchronizing section 321 determines whether the played position of metadata is after the played position of video data or not. If the played position of the metadata is after the played position of video data, the play synchronizing section 321 moves to step ST74. If the played position of metadata is not after the played position of the video data, the play synchronizing section 321 moves to step ST75.

In step ST74, the play synchronizing section 321 performs played-position synchronizing processing of synchronizing the position to play the metadata with the position to play the video data and moves to step ST77. The play synchronizing section 321 supplies a synchronization control signal CP for synchronizing the positions to play to the metadata playing section 322, whereby the play of the metadata may be temporarily stopped, and the play may be started when the played position of video data and the played position of metadata are equal, for example. Alternatively, the played positions are synchronized by returning the position to play metadata to the position to play video data.

In step ST75, the play synchronizing section 321 determines whether the played position of metadata is before the played position of video data or not. If the played position of metadata is before the played position of video data, the play synchronizing section 321 moves to step ST76. If the played position of the metadata is not before the played position of the video data, the play synchronizing section. 321 moves to step ST77.

In step ST76, the play synchronizing section 321 performs played-position synchronizing processing of synchronizing the position to play the metadata with the position to play the video data and moves to step ST77. In other words, the play synchronizing section 321 supplies a synchronization control signal CP to the metadata playing section 322, whereby the position to play metadata may be advanced to the position to play video data, and the positions to play may be synchronized.

In step ST77, the play synchronizing section 321 determines whether the exit instruction has been supplied from the control section 325 or not. If the exit instruction has not been supplied from the control section 325, the play synchronizing section 321 returns to step ST71. If the exit instruction has been supplied from the control section 325, the play synchronizing section 321 exits the operation.

Figure 12:
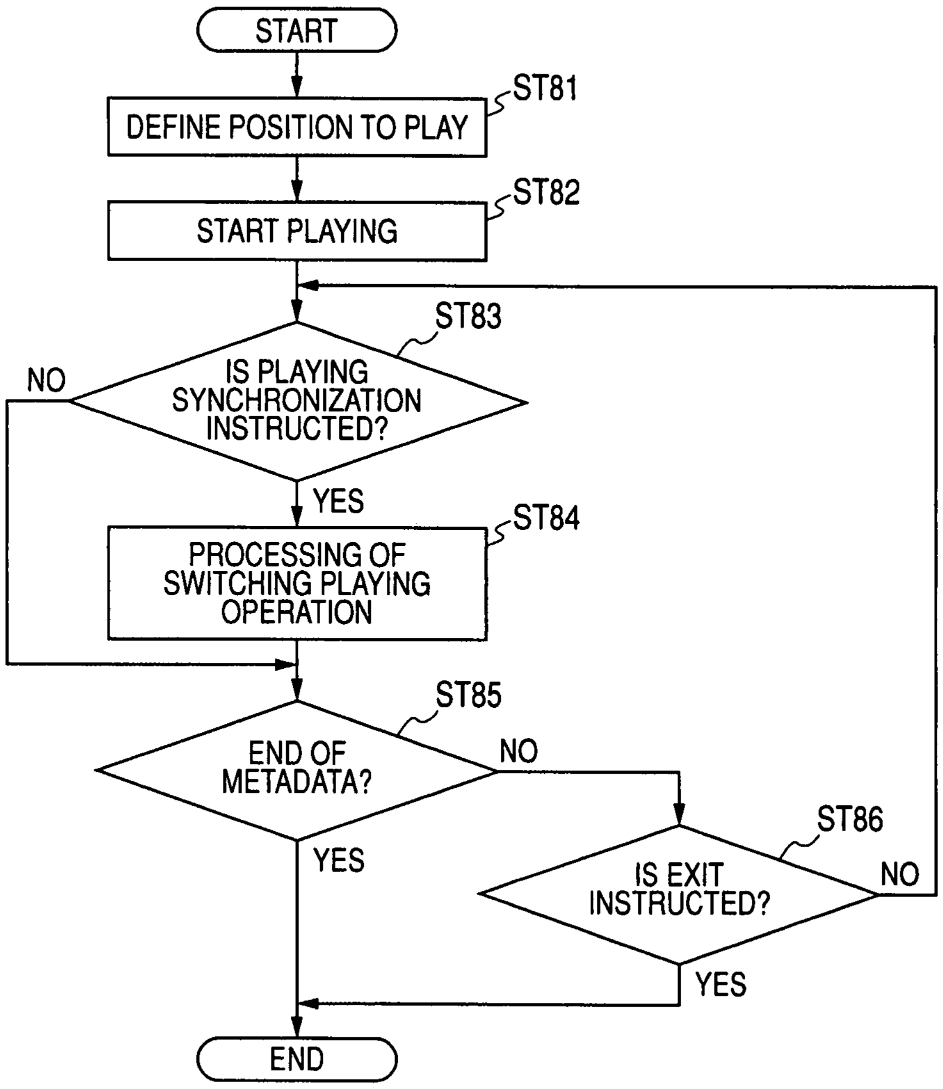
FIG. 12 is a flowchart showing operations by a metadata playing section.

FIG. 12 is a flowchart showing operations by the metadata playing section. In step ST81, the metadata playing section 322 defines the position to play. In other words, the metadata playing section 322 defines the position selected by a user through the user interface section 326 as the position to play and moves to step ST82.

In step ST82, the metadata playing section 322 starts a playing operation and sequentially loads and supplies metadata stored in the metadata storage section 317 from the position to play to the output section 323.

In step ST83, the metadata playing section 322 determines whether a play synchronization instruction has been supplied from the play synchronizing section 321 or not. If the play synchronization instruction has been supplied in response to the supply of a synchronization control signal CP from the play synchronizing section 321, the metadata playing section 322 moves to step ST84. If the play synchronization instruction has not been supplied, the metadata playing section 322 moves to step ST85.

In step ST84, the metadata playing section 322 performs processing of switching the playing operation based on the play synchronization instruction from the play synchronizing section 321 and moves to step ST85. For example, based on the synchronization control signal CP, the metadata playing section 322 may switch the operation to temporarily stop the playing operation or to advance the position to play, whereby the position to play metadata may be synchronized with the position to play video data.

In step ST85, the metadata playing section 322 determines whether the metadata is not at the end or not. If the metadata is not at the end, the metadata playing section 322 moves to step ST86. If the metadata is at the end, the metadata playing section 322 exits the operation.

In step ST86, the metadata playing section 322 determines whether the exit instruction has been supplied from the control section 325 or not. If the exit instruction has not been supplied from the control section 325, the metadata playing section 322 returns to step ST83. If the exit instruction has been supplied from the control section 325, the metadata playing section 322 exits the operation.

Figure 13:
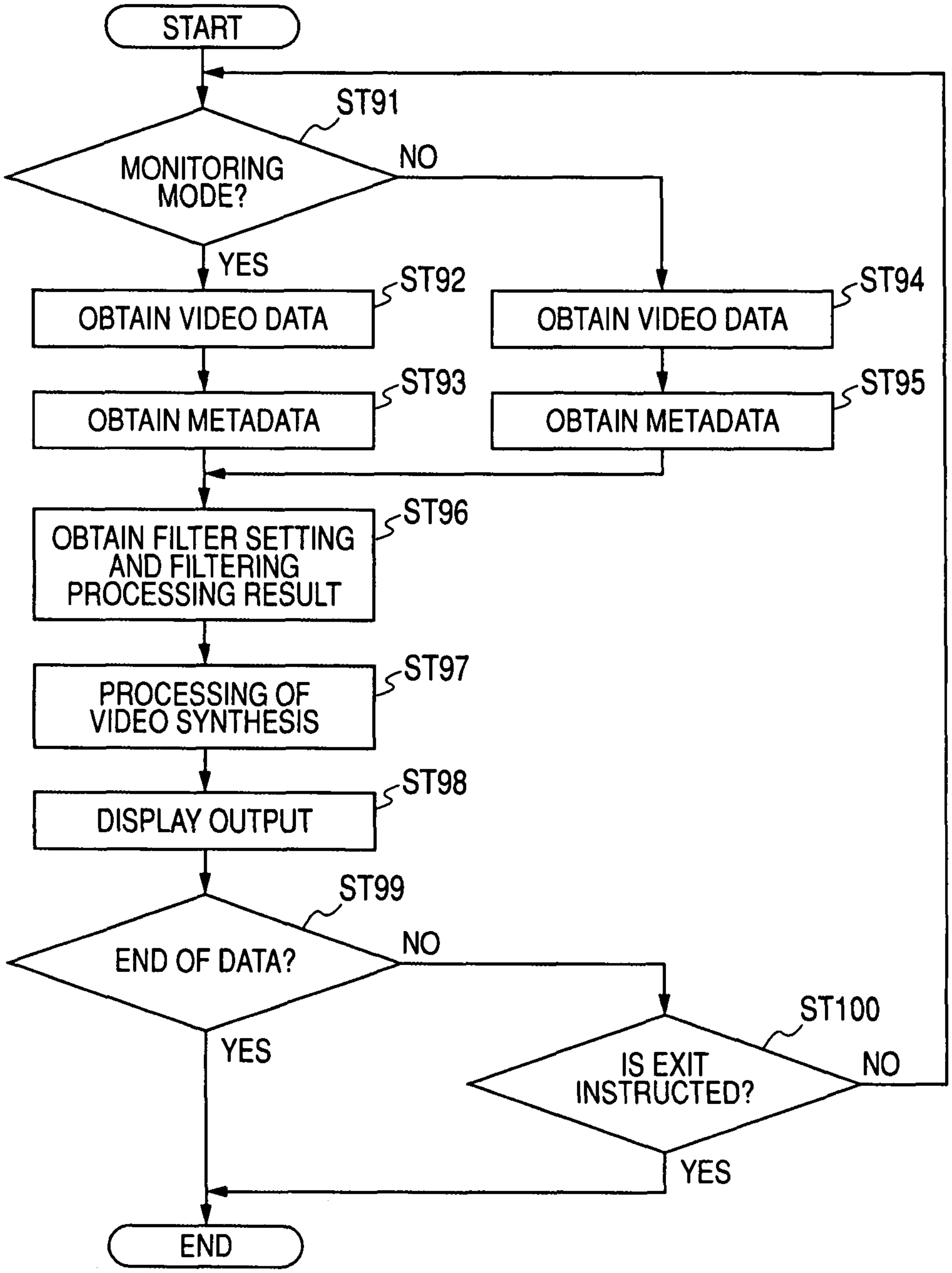
FIG. 13 is a flowchart showing operations by an output section.

FIG. 13 is a flowchart showing operations by the output section. In step ST91, the output section 323 determines whether one of the monitoring mode and play mode is set or not. If the monitoring mode is set, the output section 323 moves to step ST92. If the monitoring mode is not set, that is, if the play mode is set, the output section 323 moves to step ST94.

In step ST92, the output section 323 obtains video data from the video data obtaining section 311 and moves to step ST93. In step ST93, the output section 323 obtains metadata from the metadata obtaining section 312 and moves to step ST96.

In step ST94, the output section 323 obtains video data from the video data playing section 320 and moves to step ST95. In step ST95, the output section 323 obtains metadata from the metadata playing section 322 and moves to step ST96.

In step ST96, the output section 323 obtains the filter setting defined in the metadata filter section 313 and the filtering processing result and moves to the step ST97.

In step ST97, the output section 323 performs picture synthesis processing and moves to step ST98. The picture synthesis processing synthesizes a picture based on the metadata, a picture of the filter setting and/or a picture based on the filtering processing result on the monitoring picture based on video data.

In step ST98, the output section 323 performs display output and outputs the video signal resulting from the picture synthesis processing to a picture display device and moves to step ST99.

In step ST99, the output section 323 determines whether the data is at the end or not. If the data is not at the end, the output section 323 moves to step ST100. If the data is at the end, the output section 323 exits the operation.

In step ST100, the output section 323 determines whether the exit instruction has been supplied from the control section 325 or not. If the exit instruction has not been supplied from the control section 325, the output section 323 returns to step ST91. If the exist instruction has been supplied from the control section 325, the output section 323 exits the operation.

Next, operations by the monitoring system will be described. The monitoring system 10 obtains the metadata created by the monitoring terminal 20 through the monitoring apparatus 30. The monitoring apparatus 30 performs filtering processing by using the obtained metadata and switches the operation of the monitoring apparatus 30 or the operation by the monitoring terminal 20 based on the filtering processing result.

A filter setting FS corresponding to the information indicating a monitored subject included in metadata Dm is stored in the filter setting storage section 314. For example, if the metadata Dm includes moving subject detection information indicating whether a moving subject has been detected or not, a user stores a filter setting for detecting moving subject detection information so that the user can obtain the filtering processing result indicating whether a moving subject has been detected or not by using the filter setting. If the metadata Dm includes information indicating the position of a moving subject, a user stores a filter setting indicating a predefined area so that the user can obtain the filtering processing result indicating whether a moving subject enters to the user defined area or not by using the filter setting. Alternatively, a cautious area outside of a predefined area may be defined, and the filter setting indicating the cautious area may be stored so that the filtering processing result indicating whether a moving subject approaches the user-defined area or not can be provided by using the filter setting. If the metadata Dm includes information indicating a temperature, a user may store a threshold value of the temperature as a filter setting so that the user can obtain the filtering processing result indicating whether the temperature of the place having the monitoring terminal 20 is higher than the threshold value or not by using the filter setting. If the metadata Dm includes information indicating the intensity of a monitoring image, a user may store a threshold value of the intensity as a filter setting so that the user can obtain the filtering processing result indicating whether the intensity of a monitoring picture is lower than the threshold value or not by using the filter setting. Furthermore, if the metadata Dm includes information indicating a user operation, a predetermined operation may be stored as a filter setting so that the filtering processing result indicating whether the predetermined operation has been performed or not can be provided by using the filter setting.

Now, a case will be described that the operation by the monitoring apparatus 30 is switched based on a filtering processing result FJ. If the monitoring apparatus 30 is set in the monitoring mode, the metadata filter section 313 performs filtering processing on metadata Dm supplied from the metadata obtaining section 312 and supplies the filtering processing result FJ to the switching instructing section 315 and output section 323. If it is determined that the storage of a monitoring picture is necessary based on the filtering processing result FJ, the switching instructing section 315 supplies a storage instructing signal CR to the video data obtaining section 311 and causes the video data storage section 316 to store the obtained video data. The output section 323 outputs a warning and/or alarm based on the filtering processing result FJ.

If the switching instructing section 315 is set in a dynamic alarm mode and when the filtering processing result indicates that a moving subject has been detected, the switching instructing section 315 supplies a storage instructing signal CR to the video data obtaining section 311 and causes the video data storage section 316 to store the video data obtained by the video data obtaining section 311.

By configuring to store video data in the video data storage section 316 in this way if the filtering processing result indicates that a moving subject has been detected, the video data during a period when a moving subject is being detected can be stored in the video data storage section 316. Thus, since the video data in a period when checking a moving subject is not necessary is not stored in the video data storage section 316, video data can be stored efficiently in the video data storage section 316.

If the switching instructing section 315 is set in a minimum mode and when the filtering processing result indicates that the position of a moving subject is close to or within an area predefined by a user, the switching instructing section 315 supplies a storage instructing signal CR to the video data obtaining section 311 and causes the video data storage section 316 to store the video data obtained by the video data obtaining section 311.

By storing video data in the video data storage section 316 in this way if the filtering processing results in that the position of a moving subject approaches or is within the area predefined by a user, the video data storage section 316 can store the video data during a period when the output of a warning is necessary since the position of a moving subject is close to the area predefined by a user or during a period when the output of an alarm is necessary since the position of a moving subject is within the area predefined by a user. Therefore, since the video data of the state for which a warning or alarm is to be output can be only stored in the video data storage section 316, video data can be further efficiently stored in the video data storage section 316.

By starting the storage of video data when the position of a moving subject approaches an area predefined by a user, the monitoring picture immediately before an alarm is output can be checked when a warning is output since the position of a moving subject is within the area predefined by a user after that.

Furthermore, the switching of the imaging operation by the monitoring terminal 20 may be instructed by the switching instructing section 315, as described later, to obtain a monitoring picture suitable for monitoring. In this case, the storage of video data and/or the instruction for switching the imaging operation may be performed when the position of a moving subject approaches the area predefined by a user, for example. Here, if the switching of the imaging operation and/or the storage of video data is/are to be performed when the position of a moving subject is within the area predefined by a user, which results in the output of an alarm, the monitoring picture upon output of the alarm may not be stored due to the switching of the imaging operation. However, by configuring to perform the storage of video data and/or the instruction for switching the imaging operation when the position of a moving subject approaches the area predefined by a user, a monitoring picture suitable for monitoring can be provided when the position of a moving subject is within the area predefined by a user after that. Therefore, the monitoring picture upon output of an alarm can be stored as a picture suitable for monitoring.

Next, a case will be described that a display switching operation is performed based on a filtering processing result. The output section 323 in the monitoring mode generates one of a monitoring picture, metadata and a filter setting based on the video data Dv supplied from the video data obtaining section 311, the metadata Dm supplied from the metadata obtaining section 312 or the filter setting FS supplied from the metadata filter section 313 or a display signal VS for displaying a synthesis thereof on the screen of a display device. The output section 323 further switches the display based on the filtering processing result FJ by the metadata filter section 313.

Figure 14A:
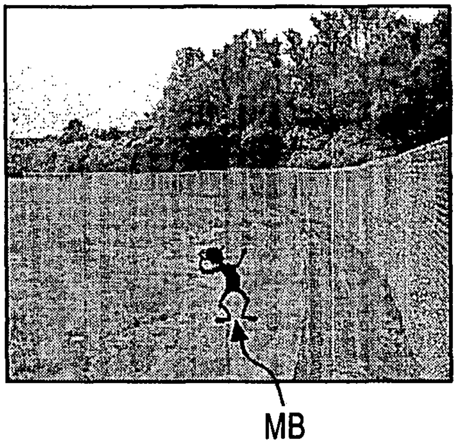
FIGS. 14A to 14C are diagrams showing a monitoring picture, a picture based on metadata and a picture of a filter setting.
Figure 14B:
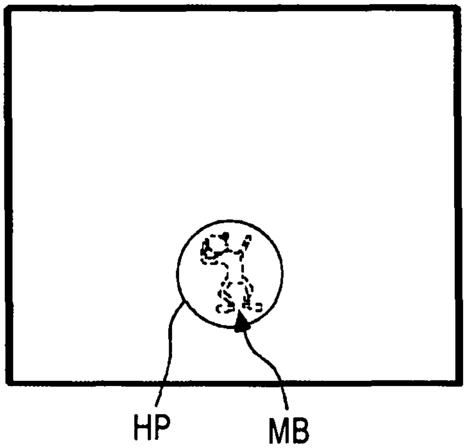
Figure 14C:
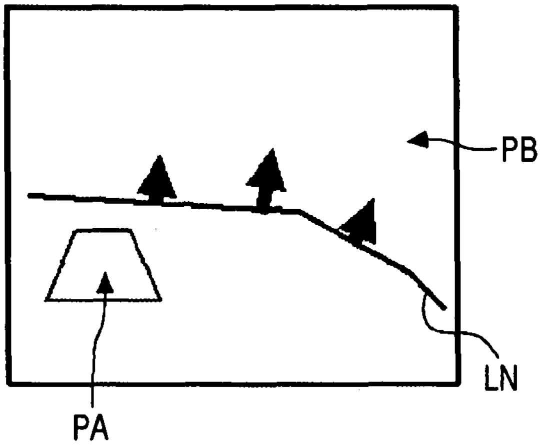

FIGS. 14A to 14C show a monitoring picture, a picture of metadata and a picture of a filter setting, respectively. FIG. 14A is a monitoring picture based on video data. FIG. 14B illustrates a picture of metadata and includes a moving subject position indication HP based on moving subject position information if the moving subject position information is included in the metadata. The dashed line indicates a moving subject MB. FIG. 14C illustrates a picture of a filter setting. A trapezoidal area PA and an area PB having the arrows with respect to the boundary LN are divided based on whether a warning and/or alarm is/are to be output.

Figure 15A:
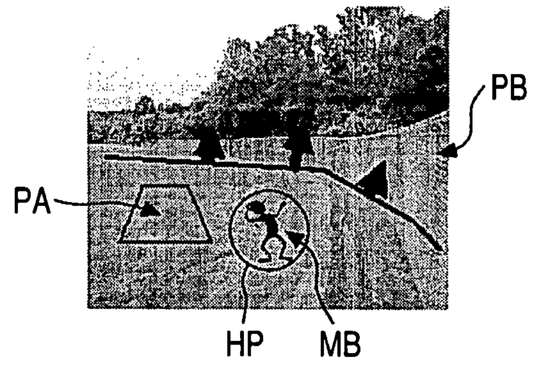
FIGS. 15A to 15D are diagrams showing pictures output from the output section.
Figure 15B:
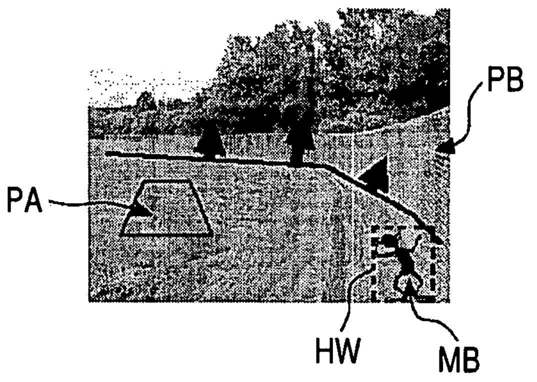
Figure 15C:
Figure 15D:
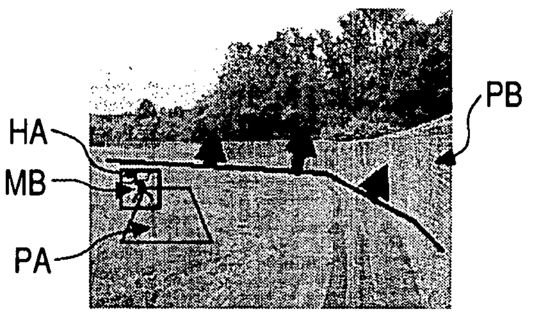

The output section 323 synthesizes a monitoring picture, a picture of metadata and a picture of a filter setting and generates and outputs a display signal VS of the synthesized picture shown in FIG. 15A. If the filtering processing result indicates that a moving subject MB has moved and that the position of the moving subject MB has approached an area predefined by a user, the output section 323 switches the display and outputs a warning, which is a monitoring result. Since the position of a moving subject MB can be determined based on the moving subject position information, a warning HW, which is a rectangular dashed-line indication, may be displayed at the position of the moving subject MB when the moving subject MB approaches an area PB, as shown in FIG. 15B, for example. The output section 323 switches the display and outputs an alarm, which is a monitoring result, when the filtering processing result indicates that the position of a moving subject MB is within an area predefined by a user. For example, as shown in FIG. 15C, when a moving subject MB enters to the area PB, an alarm HA, which is a rectangular frame indication, is displayed at the position of the moving subject MB. Furthermore, as shown in FIG. 15D, when a moving subject MB enters to an area PA, an alarm HA, which is a rectangular frame indication, is displayed at the position of the moving subject MB. By graphically displaying the warning HW or alarm HA, which is a monitoring result, the monitoring result can be easily and properly recognized from the picture based on the display signal VS.

When the filtering processing result relates to the temperature, the intensity or an abnormal operation, for example, the output section 323 may output a warning and/or alarm relating to the information by text or graphically.

Next, a case will be described that the monitoring apparatus 30 is set in the play mode. The metadata filter section 313 performs filtering processing on metadata Dmp supplied from the metadata playing section 322 and supplies the filtering processing result FJ to the output section 323. The output section 323 generates one of a monitoring picture, metadata and a filter setting based on the video data Dvp supplied from the video data playing section 320, the metadata Dmp supplied from the metadata playing section 322 or the filter setting FS supplied from the metadata filter section 313 or a display signal VS for displaying a synthesis thereof on the screen of a display device. The output section 323 further switches the display based on the filtering processing result FJ by the metadata filter section 313.

The video data playing section 320 plays video data from the position selected by a user and supplies the video data Dvp loaded from the video data storage section 316 to the output section 323. Since the play synchronizing section 321 is provided, the metadata in synchronization with the video data Dvp is loaded from the metadata storage section 317 by the metadata playing section 322 and is supplied to the output section 323.

The output section 323 generates and outputs a display signal VS by synthesizing the played monitoring picture, the played metadata picture and the filter setting picture. Here, when the filtering processing result indicates that the position of a moving subject is close to or within the area predefined by a user, the output section 323 outputs a warning or alarm in the same manner as in the monitoring mode.

In order to determine whether an abnormal operation has been performed or not, the output section 323 may output a warning or alarm at the position where an abnormal operation is performed based on the filtering processing result by the metadata filter section 313 when a user performs filter setting. Furthermore, the output section 323 may output a warning or alarm at the position including information corresponding to metadata when filtering processing on metadata is performed based on text information defined by a user, for example.

When filtering processing on metadata is performed, a wide variety of monitoring operations may be performed easily by using various information on a monitored subject only by defining a filter setting and a switching instruction in accordance with the filtering processing result from the filter setting even if the information on the monitored subject is changed and/or the number of types of information on the monitored subject is increased.

Defining various filter settings allows a wide variety of notifications. For example, as described above, a warning may be output when a moving subject is approaches a predefined area, and an alarm may be output when a moving subject enters to the area. Thus, detail monitoring operations may be performed easily.

Furthermore, since metadata describes information on a monitored subject in a markup language, the metadata filter section and/or metadata playing section may be only required to have a function of reading the markup language. The necessity of a metadata filter section and/or metadata playing section for each format of metadata is eliminated in this way, which simplifies the construction of the monitoring apparatus. Furthermore, since desired information on a monitored subject may be played or filtering processing may be performed thereon independent of the format of metadata, various metadata can be played in synchronization with the monitoring picture.

In the monitoring apparatus 30 set in the play mode, the video data playing section 320 plays video data from the position selected by a user, and the metadata playing section 322 plays the metadata in synchronization with video data Dvp. However, the metadata storage section 317 can store various kinds of information on a monitored subject, and the metadata playing section 322 can play the information of the stored metadata. Therefore, the metadata playing section 322 may play the information selected by a user, and the video data playing section 320 may play video data in synchronization with the information of the metadata to be played. In this case, the metadata playing section 322 notifies the played position of the played metadata to the play synchronizing section 321. The play synchronizing section 321 supplies a synchronization control signal to the video data playing section 320 and controls the operation by the video data playing section 320 such that the played position notified from the metadata playing section 322 and the position to play the video data stored in the video data storage section 316 by the video data playing section 320 are synchronized.

This allows a user not only to check a monitoring picture by selecting the position to play video data but also to select and play desired information of the metadata. Thus, the monitoring picture in synchronization with the information can be automatically played to check the monitoring picture. By selecting and playing desired information, a warning and/or alarm based on the played information can be output. The output of a warning and/or alarm in the monitoring mode and/or play mode is not limited to the graphical display by the output section but may be the output of a warning and/or alarm by voice or the display of a warning and/or alarm by using an indicator such as a light-emitting element.

By the way, the operation switching based on a filtering processing result may be performed not only on the monitoring apparatus 30 but also on the monitoring terminal 20. A case that the operation switching is performed on the monitoring terminal 20 based on a filtering processing result will be briefly described below.

The metadata filter section 313 performs filtering processing on metadata Dm supplied from the metadata obtaining section 312 and supplies the filtering processing result FJ to the switching instructing section 315. The switching instructing section 315 generates a switching instructing signal CA and supplies it to the monitoring terminal 20 based on the filtering processing result FJ. Here, the switching instructing section 315 switches the operation of the monitoring terminal 20 such that the frame rate of a monitoring picture can be high, for example. In this case, since the time intervals of monitoring pictures are short, the movement of a moving subject can be monitored at detail time intervals. Since the frame rate of a monitoring picture is low when a moving subject is not detected, the number of times of supply of video data from the monitoring terminals 20 to the monitoring apparatus 30 is low. Therefore, the delay of the supply of video data from the monitoring terminal 20 to the monitoring apparatus 30 can be prevented which is due to the increase in traffic of the network 40 by the use of multiple monitoring terminals 20. Since the switching instructing section 315 may switch to a low compression rate, which can decrease the deterioration of the quality of monitoring pictures. Therefore, a moving subject can be checked on high quality pictures. Since the compression rate is high when a moving subject is not detected, the delay of the supply of video data from the monitoring terminals 20 to the monitoring apparatus 30 can be prevented which is due to the increase in traffic of the network 40 by the use of multiple monitoring terminals 20.

If the filtering processing result indicates that a monitoring picture is excessively bright or dark, the switching instructing section 315 controls the operations by the lens section 211, imaging section 212 or imaged signal processing section 213 through the imaging operation switching section 22, whereby a switching instructing signal CA is generated and supplied to the monitoring terminal 20 so as to obtain a monitoring picture with a desired intensity. By generating a switching instructing signal CA in this way, a monitoring picture supplied from the monitoring terminal 20 can automatically have a proper intensity.

If the filtering processing result indicates that an abnormal operation has been performed, the switching instructing section 315 controls the operation and/or direction of imaging by the lens section 211 through the imaging operation switching section 22, whereby a switching instructing signal CA is generated and supplied to the monitoring terminal 20 so as to obtain a monitoring picture in the direction where the abnormal operation has been performed. By generating a switching instructing signal CA in this way, the monitoring terminal 20 may be efficiently used, and a monitoring picture suitable for monitoring can be provided.

By switching the operation by the monitoring terminal 20 based on the filtering processing result of metadata as described above, a monitoring picture suitable for monitoring can be automatically obtained. Furthermore, the use of the filtering processing result of metadata can automatically provide an optimum monitoring picture based on changed and/or additional information on a monitored subject only by generating a switching instructing signal CA in accordance with a filter setting and the filtering processing result from the use of the filter setting even when the information on a monitored subject is changed and/or added.

It should be understood by those skilled in the art that various modifications, combinations, sub-combinations and alterations may occur depending on design requirements and other factors insofar as they are within the scope of the appended claims or the equivalents thereof.

What is claimed is:

1. A monitoring apparatus comprising:

a video data obtaining section for obtaining video data from a monitoring terminal;

a metadata obtaining section for obtaining from the monitoring terminal, metadata describing information on a monitored subject, the information comprising details of one or more interactions with a user interface performed by the monitored subject;

a filter setting storage section for storing a filter setting;

a metadata filter section for performing filtering processing on the metadata by using a filter setting stored in the filter setting storage section; and an output section for outputting a monitoring result based on the filtering processing result obtained by performing filtering processing in the metadata filter section, wherein the output section is further configured to output a picture based on the synthesis of a picture generated from video data obtained by the video data obtaining section, a picture generated from the metadata obtained by the metadata obtaining section, and a picture generated from the filter setting used by the metadata filter section, the monitoring result including a picture having an image section of video data corresponding to the filtering processing result, an image section about at least a part of a criteria of the filtering processing, and an image section about the metadata relating to the monitored subject in the image section of video data corresponding to the filtering processing result, the metadata describing the one or more interactions with the user interface performed by the monitored subject, and obtained by the metadata obtaining section.

2. The monitoring apparatus according to claim 1, further comprising:

a video data storage section for storing the video data;

a metadata storage section for storing the metadata;

a video data playing section for playing video data stored in the video data storage section;

a metadata playing section for playing metadata stored in the metadata storage section; and a play synchronizing section for causing the metadata playing section to play metadata in synchronization with the video data played by the video data playing section in order to play the video data and the metadata together, wherein the metadata filter section performs filtering processing on the metadata played by the metadata playing section by using a filter setting stored in the filter setting storage section; and the output section outputs a picture showing the monitoring result by using one of a picture based on the video data played by the video data playing section, a picture based on metadata played by the metadata playing section and a picture showing the filter setting used in the metadata filter section or a picture resulting from the synthesis of multiple pictures.

3. The monitoring apparatus according to claim 2, wherein the video data obtaining section causes the video data storage section to store the obtained video data based on the filtering processing result obtained by performing filtering processing in the metadata filter section.

4. The monitoring apparatus according to claim 1, wherein the video data obtaining section and the metadata obtaining section obtain the video data and the metadata from the monitoring terminal over a network.

5. The monitoring apparatus according to claim 1, wherein the information relating to a monitored subject has at least one of:

moving subject detection information indicating whether a moving subject has been detected or not; or moving subject position information indicating the position of a detected moving subject.

6. The monitoring apparatus according to claim 1, wherein the information relating to a monitored subject has information indicating the state of an area monitored by the monitoring terminal.

7. A monitoring method comprising the steps of:

obtaining video data;

obtaining metadata describing information on a monitored subject, the information comprising details of one or more interactions with a user interface performed by the monitored subject;

performing filtering processing on the metadata by using a filter setting; and outputting a monitoring result based on the filtering processing result obtained by performing filtering processing, outputting a picture based on the synthesis of a picture generated from video data obtained by the video data obtaining section, a picture generated from the metadata obtained by the metadata obtaining section, and a picture generated from the filter setting used by the metadata filter section, the monitoring result including a picture having an image section of video data corresponding to the filtering processing result, an image section about at least a part of a criteria of the filtering processing, an image section about the metadata relating to the monitored subject in the image section of video data corresponding to the filtering processing result, the metadata describing the one or more interactions with the user interface performed by the monitored subject.

8. The monitoring apparatus according to claim 1:

wherein an image section of video data corresponding to the filtering processing result, an image section about at least a part of a criteria of the filtering processing, and an image section about the metadata relating to a target in the image section of video data corresponding to the filtering processing result, are displayed on a screen.

* * * * *